Nov. 8, 1949 L. B. WAGNER 2,487,286
STOKER TIMER
Filed April 15, 1947 3 Sheets-Sheet 1
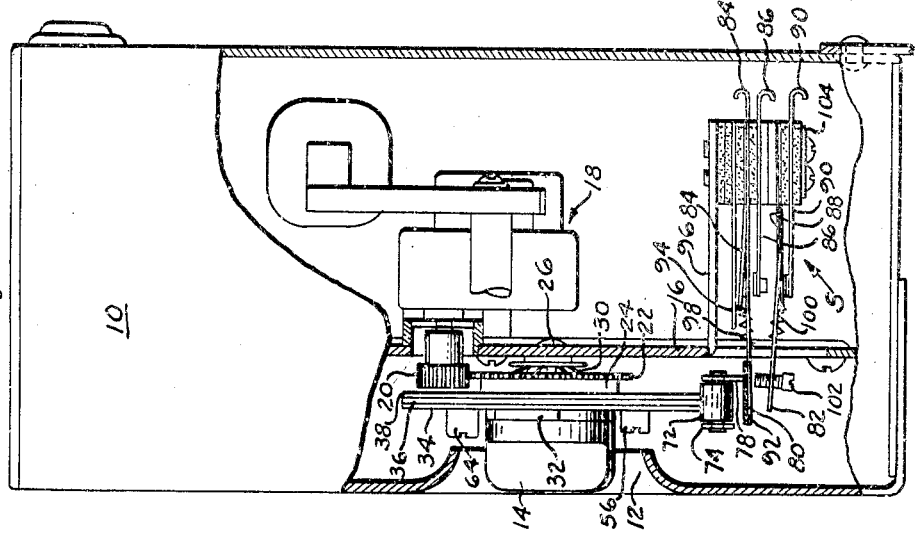
INVENTOR.
LELAND B. WAGNER
BY
*Bair & Freeman*
ATTORNEYS Nov. 8, 1949     L. B. WAGNER     2,487,286
STOKER TIMER
Filed April 15, 1947     3 Sheets-Sheet 2
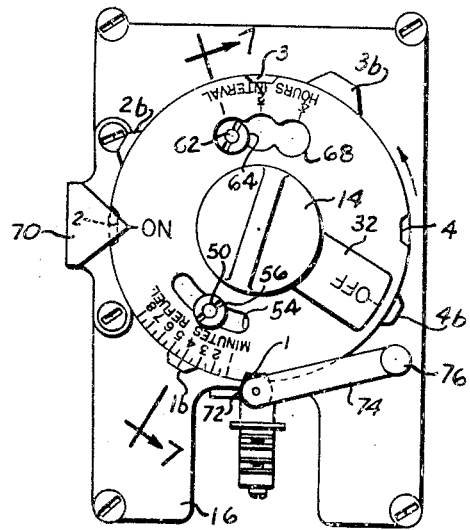
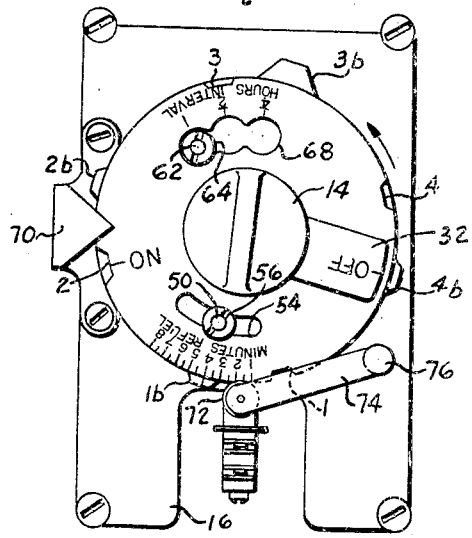
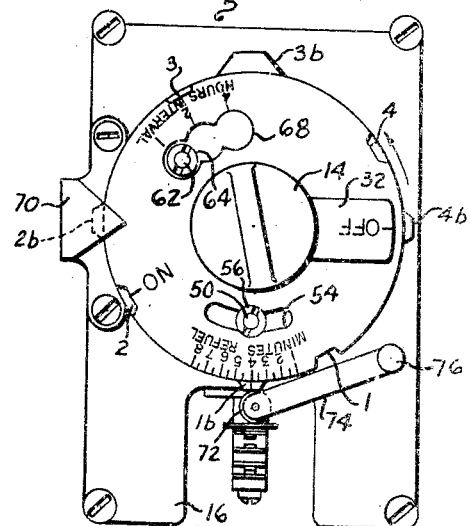
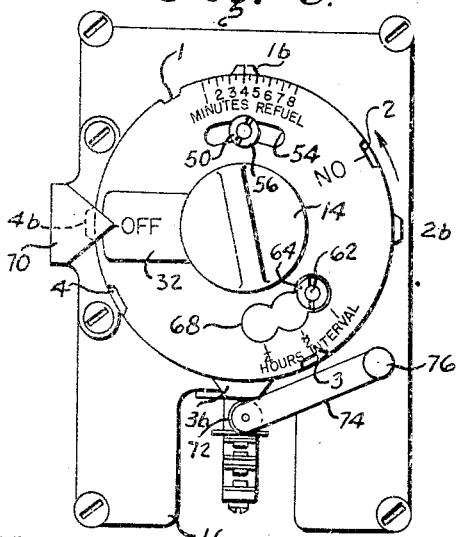
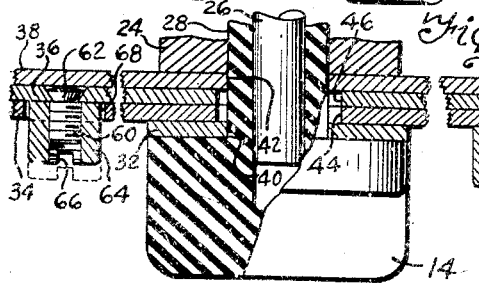
INVENTOR.
LELAND B. WAGNER
BY
*Bair & Freeman*
ATTORNEYS

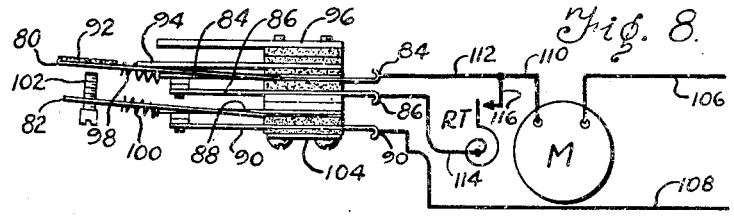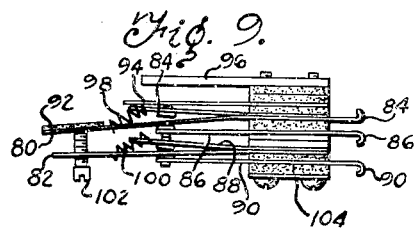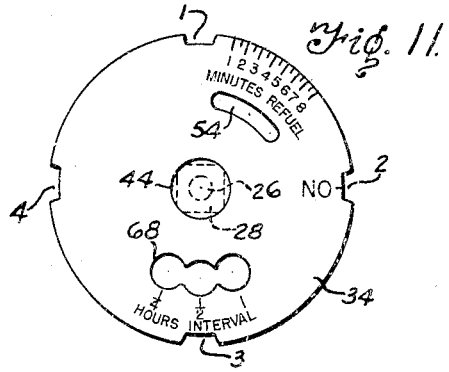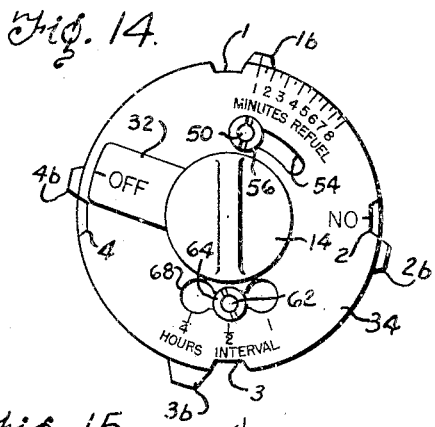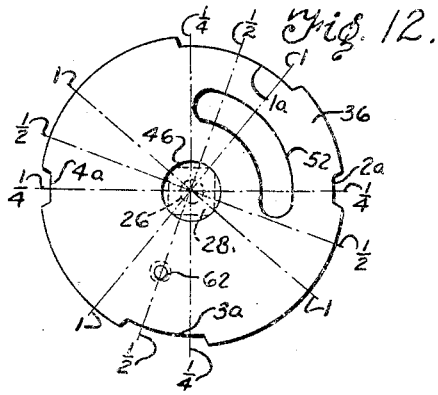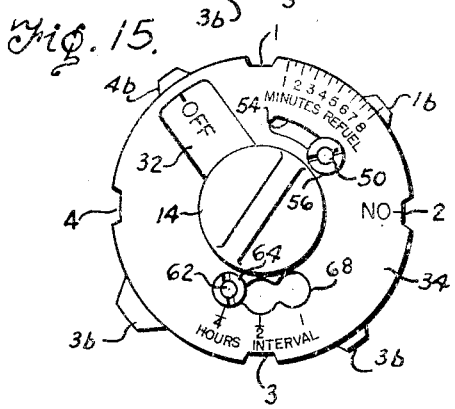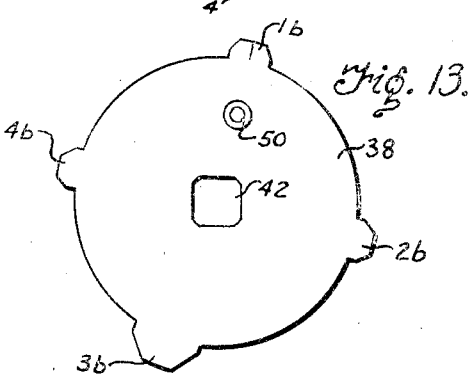

Patented Nov. 8, 1949

2,487,286

UNITED STATES PATENT OFFICE 2,487,286

STOKER TIMER

Leland B. Wagner, Goshen, Ind., assignor to Penn Electric Switch Co., Goshen, Ind., a corporation of Iowa Application April 15, 1947, Serial No. 741,497

11 Claims. (Cl. 200—38)

This invention relates to an automatic timing device for stokers which are normally controlled by a room thermostat.

One object of the invention is to provide a stoker timer which refuels the stoker by energizing the stoker motor for a predetermined period of time and at predetermined time periods regardless of operation of the stoker by the room thermostat so that a proper fuel bed is kept even in mild weather when room thermostat operations are relatively infrequent.

It is well known in connection with a stoker that it should be operated periodically to prevent the fire from becoming stagnant and possibly extinguished when room thermostat operations are infrequent. It is desirable of course that such periodic operation be automatic. This can be accomplished by means of a time switch which shunts the room thermostat and operates for instance once each hour, the stoker timer being closed for a period of a few minutes in order to permit sufficient operation of the stoker to get the fire burning vigorously. This is desirable even though the house is warm enough and the room thermostat is not calling for heat, as if no stoker timer is provided the fire may go out or be so low that it does not burn properly during the succeeding period of time that the room thermostat does call for heat.

Different stoker installations require these timing periods to be more or less frequent depending upon the particular type of stoker, and/or furnace, the residence in which it is installed and other variable factors. These variable factors also require the periodic timing periods to be different in length for most efficient operation of a particular stoker and this period should also be variable so that it can be adjusted in relation to the length of the period of non-operation between periods of operation.

It is therefore an important object of my invention to provide a stoker timer wherein readily adjustable means is provided to change both the length of the timing period and the length of the time period between stoker operations in a simple mechanism.

Another object is to provide an arrangement of cam plates with various lengths and heights which may be adjusted around an axis and relative to each other to secure the desired results just enumerated, an electric clock or similar motor being provided to rotate the cam plate assembly.

Still another object is to provide a series of cam plates arranged in a stack and circumferentially adjustable in relation to each other, with simple clamp mechanism for holding them in various adjusted positions as desired.

A further object is to provide the stoker timer arranged so that an "off" period can be selectively secured at the time of manually removing clinkers or otherwise cleaning the fire so that regardless of a call for heat by the room thermostat the stoker will not operate during the cleaning period, with assurance however that the "off" period will last only a predetermined time sufficiently long to permit of cleaning the fire, and that thereafter the stoker timer will revert to a position permitting the room thermostat to energize the stoker motor if it is at that time calling for heat.

Still a further object is to provide another manually selective position of the stoker timer in which the stoker is "on" at the beginning of its timing period, this being particularly desirable after a fire cleaning or rebuilding operation so as to permit the stoker to have an operating period immediately. An additional object is to provide a stoker timer which reverts to automatic operation by the timing motor if inadvertently left in either the "on" or "off" position to which it has been manually set.

With these and other objects in view, my invention consists in the construction, arrangement and combination of the various parts of my stoker timer whereby the objects contemplated are attained, as hereinafter more fully set forth, pointed out in my claims and illustrated in the accompanying drawings, wherein:

Figure 1 is a front elevation of a stoker timer embodying my invention, a portion of the front being broken away to show the mechanism.

Figure 2 is an end elevation thereof with a portion broken away and other portions shown in cross section.

Figures 3, 4, 5 and 6 are front elevations of the stoker timer mechanism showing various positions assumed thereby during operation of the stoker timer.

Figure 7 is an enlarged sectional view on the line 7—7 of Figure 3.

Figure 8 is a side elevation of the switch stack used in connection with cams of the stoker timer and showing the switches in a different position than the normal position of Figure 2, the electrical connections of the switch blades to the room thermostat and the stoker motor being shown electro-diagrammatically, the switch in this figure corresponding to Figures 3 and 4.

Figure 9 is a similar view of the switch showing the switch blades in the position assumed in response to the cams being positioned as in Figure 6.

Figures 10 to 13 are front elevations of elements of the stoker camming arrangement, these four figures showing respectively a refuel "off" cam pointer, a refuel "on" cam, a periodic timing cam and a refuel "off" cam.

Figure 14 is a front elevation of the camming mechanism similar to Figure 1 but showing the refueling cams adjusted for a one minute refueling period instead of a seven minute refueling period, as shown in Figures 1 to 6, and for one-half hour intervals instead of one hour intervals as illustrated in Figures 1 to 6, and Figure 15 is a similar view showing adjustment for an eight minute refuel period at one-quarter hour intervals.

On the accompanying drawings I have used the reference numeral 10 to indicate a housing in which my stoker timer mechanism is mounted. The housing has a sight opening 12 (its outline being shown by dotted lines in Figure 1) in its front wall in which is located a manual control knob 14 for the purpose of readjusting the cam mechanism in relation to the timing motor as will hereinafter appear.

A frame plate 16 is mounted in the housing 10, and supported thereon is an electric motor 18 such as one of the electric clock type. It is provided with a shaft on which a pinion 20 is mounted, the pinion rotating about once every twenty minutes. A gear 22 meshes with the pinion 20 and has a pitch diameter three times that of the pinion 20 so that the gear rotates once each hour. These periods are not critical and may be obviously varied as found desirable or necessary. The gear 22 has a hub 24 for frictionally driving the cam mechanism as will appear later.

A stud 26 is fixed in relation to the frame plate 16 and the control knob 14 has a shank 28 rotatable thereon. The hub 24 and the gear 22 surround the shank 28 and the shank is square as indicated by dotted lines in Figures 11 and 12, the hub 24 being provided with a square opening which fits the square shank so that the hub normally imparts rotation to the shank and the knob 14. The knob and the hub can be manually rotated relative to the gear 22 however as the gear is rotatable in relation to both and normally held in frictional contact with the hub by a spring washer 30.

Also mounted on the shank 28 is a refuel "off" cam pointer 32 shown in Figure 10, a refuel "on" cam 34 shown in Figure 11, a periodic timing cam 36 shown in Figure 12 and a refuel "off" cam 38 shown in Figure 13. The pointer 32 and the cam 38 are provided with square openings 40 and 42, respectively, which fit the square shank 28 so that both rotate with it and with the hub 24. The cams 34 and 36 however are provided with round openings 44 and 46 which fit around the corners of the shank as indicated by dotted lines in Figures 11 and 12. The cams 34 and 36 are accordingly free to rotate relative to the shank.

Means is provided to secure the cam 34 to the cam 38 so that the two will rotate together and this is best shown in Figure 7. It comprises a refuel timing stud 48 riveted to the cam 38, a countersunk opening 50 being provided for this purpose. The stud extends through an arcuate slot 52 in the cam 36 and through a somewhat shorter arcuate slot 54 in the cam 34. The slot 52 is made wide for ample clearance. The stud 48 is threaded and a clamp nut 56 is positioned thereon, the nut having a slot 58 to receive a screw driver for loosening and tightening the nut as desired.

The cam 34 is secured to the cam 36 for simultaneous rotation therewith in one of three positions by means of a periodic timing stud 60. The stud 60 is riveted into a counter-sunk hole 62 of the cam 36 and has a clamp nut 64 threaded thereon. The nut is provided with a screw driver slot 66 and is located in an arcuate slot 68 of the cam 34 which has three clearly defined sections labeled ¼, ½ and 1 to indicate quarter hour, half hour and one hour timing intervals.

The nut 64 of course may be loosened from the position shown in Figure 7 to the dotted position shown therein and shifted to another one of the three positions in the slot 68 and retightened. Figures 1, 14 and 15 upon comparison will be found to show adjustments to the three different positions.

The cam 34 is provided with four notches indicated as 1, 2, 3 and 4. The cam 36 is provided with four notches indicated as 1a, 2a, 3a and 4a. The cam 38 is provided with four lobes indicated as 1b, 2b, 3b and 4b. The notches 1, 2, 3 and 4 are of equal length. The notches 2a and 4a are of similar length but the notch 3a is about twice the length of the notches 2a and 4a and the notch 1a is about three times the length of the notches 2a and 4a. The cam lobes 1b, 2b and 4b are of similar height and length, whereas the lobe 3b is of similar length but greater height. The purpose of these variations in dimensions will hereinafter appear.

The pointer 32 has an indication "Off" thereon. The cam 34 has an indication "On" thereon. These indicia are cooperable with a pointer 70 secured to the frame plate 16 and observable through the sight opening 12. This is for manual control of the stoker timer independent of its automatic control.

The various notches and lobes of the cams 34, 36 and 38 cooperate with a roller 72 carried by an arm 74 pivoted at 76 to the frame plate 16. The lever 74 has a lug 78 for operating a switch stack indicated generally at S. The switch stack S comprises actuating leaf springs 80 and 82 and contact leaf springs 84, 86, 88 and 90. The element 90 is a strip of insulation to prevent shorting the leaf spring 80 in relation to the arm 74.

The stack switch includes a stop blade 94 for the contact blade 84 and is mounted on an extension 96 of the frame plate 16. The actuating blade 80 is operatively connected by a toggle spring 98 with the switch blade 84 and the actuating blade 82 is operatively connected with the switch blade 88 by means of a toggle spring 100.

The switch blades 84 and 86 carry contacts that are normally disengaged from each other. The switch blades 88 and 90 carry contacts which are normally engaged with each other. This is shown in Figures 1, 2 and 5. The actuating blade 82 is adapted to be actuated by the blade 80 through the medium of a thrust screw 102 which is threaded through the blade 82 for adjustment.

The switch blades 86 and 88 are electrically connected together by a metal bridge 104 in the switch stack so that only three circuit connections are necessary to the switch. These connections are to the blades 84, 86 and 90 as shown in Figure 8. The current supply wires are shown at 106 and 108 in this figure, and the stoker motor at M. The wire 106 is connected to the motor and the wire 108 to the switch blade 90. The other terminal of the motor is connected by wires 110 and 112 to the switch blade 84. A room thermostat RT has one side connected by a wire 114 to the switch blade 86 and its other side connected by a wire 116 to the wires 110 and 112. This arrangement places the upper switch comprising the switch blades 84 and 86 in shunt with the room thermostat and the lower switch comprising the blades 88 and 90 in series therewith; the blades 86 and 88 being electrically connected together by the metal bridge 104. In Figure 8 I have shown a circuit in which the stoker timer switch S is connected in a 110 volt circuit. This is merely by way of illustration as ordinarily this current is cut down by a transformer, and a relay R shown in Figure 1 has its coil energized by the low voltage current that passes through the room thermostat and the stoker timer switch, and in turn controls the high voltage line to the motor. Since this forms no part of my present invention I have not gone into detail with respect thereto.

*Practical operation*

In the operation of my stoker timer, during normal automatic operation and assuming the parts adjusted and in the position of Figures 1 and 2 it will be noted that the switch 84—86 is off and the switch 88—90 is on. The latter switch, being in series with the room thermostat, therefore permits the room thermostat to control the stoker motor. The cam assembly rotates counter-clockwise and it will be noted that the roller 72 is riding the peripheries of the cams 34 and 36. In doing so the lever 74 is at an intermediate position where it permits the actuating blade 80 to rise to the position of Figure 2 (the blade due to its inherent resiliency being biased upwardly). The toggle spring 98, it will be noted, is in position to hold the contact spring 84 disengaged from the contacts 86.

As the cam assembly continues to rotate it will eventually reach a position as shown in Figure 3 where the roller drops into the notch 1. This permits the actuating blade 80 to swing upwardly to the position shown in Figures 3 and 8 so that the toggle spring 98 passes overcenter and lowers the switch blade 84 into engagement with the switch blade 86. These blades shunt the room thermostat so that even though it is not calling for heat a stoker operation will occur.

Continued counter-clockwise rotation of the cam assembly will cause the roller (held against the cams by the actuating spring 80) to climb out of the notch 1 and on to the periphery of the cams 34 and 36 as in Figure 4 which still leaves the upper switch 84—86 on because the lift is not sufficient to cause the terminal spring 98 to pass overcenter. When it is lifted further however by the lobe 1b as in Figure 5 the toggle spring passes overcenter and the switch 84—86 is opened thereby stopping the stoker unless the room thermostat is at that time calling for heat. The position of the switch at this time is shown in Figure 2.

The cams are set for one hour periods of stoker energization in Figures 1 to 6. Therefore only the notch 1 will be effective to turn the stoker on, the others being blanked out as shown by the periphery of the cam 36. Outside the periphery of this cam in Figure 12 I have indicated at each 90° station the quarter hour, half hour and one hour positions of the notches 1, 2, 3 and 4 of the cam 34. It will be noted that only the notch 1a of the cam 36 coincides with a one hour indication and therefore only the notch 1 is open for this particular adjustment.

Another 90° of rotation causes the lobe 2b to engage the roller 72 and lift it the same as the lobe 1b would in Figure 5 but nothing happens because the upper switch 84—86 is already off and hasn't been turned on by the notch 2 which is blanked out by the cam 36. Likewise the lobe 3b is passed by which does not turn the upper switch on because the notch is blanked out.

Finally the lobe 3b as in Figure 6 lifts the arm 74 farther than any of the other lobes, thus permitting the upper switch to remain off but engaging the screw 102 and swinging the actuating blade 82 downwardly as in Figure 9 so that the toggle spring 100 passes overcenter and opens the lower switch 88—90. This is the switch that is in series with the thermostat and therefore renders the room thermostat incapable of causing the stoker to operate or continue to operate as it is already energized, but this off cycle has no particular significance in the automatic operation of the stoker timer.

The extra high lobe 3b is provided however for the purpose of permitting manual adjustment to an off position while cleaning clinkers out of the fire or rekindling the fire after it has gone out. At that time of course it is desirable that the stoker be out of operation, otherwise its blower will blow air into the fire for producing additional combustion at a time when it is undesirable and may result in fly ash being discharged through the furnace door which of course is open at that time. Even though the stoker is off at that time it will eventually be automatically turned on again as the cam assembly continues to rotate after the manual adjustment to the off position has been made. Thus it is unnecessary for the fireman to perform a further operation to place the stoker timer back into operating condition which he may forget to do.

He may however want to cause the stoker to operate and in that case can turn the cam assembly counter-clockwise until the "On" indicia coincides with the pointer 70 which places the notch 1 in registry with the roller 72 as in Figure 3, thus permitting the upper switch 84—86 shunting the room thermostat to be closed. The adjustment can be left in this position and the on period will be automatically terminated at the end of the refueling period for which the cam assembly is set.

The cam assembly can be adjusted for shorter off intervals, for instance one-half hour apart instead of one hour apart. This adjustment is shown in Figure 14. When this adjustment is made, the notches 1 and 3 are open as shown, the notches 2 and 4 only being blocked off. Referring to Figure 12 where the four half hour indications are placed around the periphery of the cam, it will be noted that the notches 1a and 3a register with these indicia but the notches 2a and 4a do not. Similarly when the adjustment is made for quarter hour intervals as in Figure 15 all four notches 1, 2, 3, and 4 are open as the notches 1a, 2a, 3a and 4a coincide with all four quarter hour indicia around the periphery of the cam 36 in Figure 12. This arrangement permits the interval to be adjusted as desired and for each adjustment the notch 1 is left unblocked as the notch 1a extends across all three indicia (¼, ½ and 1). Thus I am assured of the possibility of a manually adjusted on period regardless of what interval the cam assembly is set for.

The period of operation of the stoker by the stoker timer is indicated as "Minutes of refuel" on the face of the cam 34. In Figures 1 to 6 this period is set at four minutes. It will be noted that each cam lobe 1b, 2b, etc. follows its corresponding cam notch 1, 2, etc. a predetermined peripheral distance. Each such distance may reduced, for instance to one minute as shown at Figure 14. The distance between the notch 1 and the lobe 1b is shortened and the same is true of the other lobes and notches. Conversely if the period is to be lengthened as to eight minutes for instance, this distance is increased as illustrated in Figure 15.

It will be remembered that the roller 72 must first drop into a notch and then ride over a lobe to secure a circuit closing operation of the upper switch 84—86 followed by opening thereof, the intervening periphery of the cams while raising the roller 72 out of the notch not effecting an opening of the switch until the roller is raised additionally by a lobe. Therefore the timing between on and off may be varied throughout the scale of minutes 1 to 8 indicated in a convenient manner and after the adjustment is made it can be locked by retightening the adjusting nut 56.

From the foregoing specification it will be obvious that all necessary adjustments are provided by my stoker timer and are readily attainable. If any time on or off cycles are required they may be had by manual turning of the knob 14 and the manual control reverts to automatic control without further personal attention.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a timer of the character disclosed, a shaft, a cam assembly thereon adapted to be normally driven by a timing motor, a pair of switches adapted to be operated by said cam assembly, said cam assembly having a notch cooperating with said first switch for closing the same, and a lobe for opening the same, means for adjusting the distance between said notch and said lobe whereby the period of closed circuit operation of said first switch may be varied, said cam assembly having a lobe of greater height than said first lobe for moving said first switch beyond its open circuit position to engage said second switch to close it, said cam assembly being manually operable independent of said timing motor for opening said second switch in the position thereof with said second lobe engaging said first switch and for closing said first switch in the position thereof with said notch cooperating with said first switch.

2. In a timer, a shaft, a cam assembly thereon, a pair of switches operated by said cam assembly, said cam assembly having notch and lobe elements cooperating with said first switch for closing the same by one element and then opening the same by the other element, means for adjusting the distance between said notch and lobe elements whereby the period of closed circuit operation of said first switch may be varied, one of said elements of said cam assembly being dimensioned larger than the other elements thereof to cause overrun of said first switch, said first switch thereupon engaging said second switch for opening it, and means to continuously rotate said cam assembly.

3. In a stoker timer of the character disclosed, a shaft, a cam assembly thereon, a pair of switches adapted to be operated by said cam assembly, said cam assembly having a notch cooperating with said first switch for closing the same and a lobe for opening the same, one lobe of said cam assembly having greater height than the others and cooperating with said second switch to open it, said cam assembly being manually operable for opening said second switch in one position thereof and for closing said first switch in another position thereof, said cam assembly having a plurality of said notches circumferentially spaced around its periphery and a plurality of said lobes, one following each of said notches, and means for selectively blocking off one or more of said notches to change the timing interval for said first switch per revolution of said timer.

4. In a timer, a cam assembly, a pair of switches adapted to be operated thereby, a timer motor normally rotating said cam assembly, said cam assembly having notches cooperating with said first switch for closing the same, and lobes for opening the same, means for adjusting said cam assembly comprising means for selectively blocking off one or more of said notches to change the number of closing operations for said first switch per revolution of said cam assembly, whereby the frequency of closed circuit operations of said first switch may be varied, one lobe of said cam assembly being extended beyond the others and cooperating with said second switch for opening it.

5. In a timer, a rotatable cam assembly, a pair of switches adapted to be operated by said cam assembly, said cam assembly having notches cooperating with said first switch for closing the same, lobes for opening the same and portions intermediate said notches and said lobes incapable of opening said switch when closed by a notch, means for adjusting said cam assembly whereby the frequency of closed circuit periods of operation of said first switch may be varied, said means comprising a cam plate for selectively blocking off one or more of said notches.

6. In a timer, a pair of switches, one normally open and the other normally closed, a timer motor, a rotating cam assembly frictionally driven thereby and manually rotatable independent of the timer motor, said cam assembly being operable to close one of said switches and open the other one at predetermined time intervals and to close said first switch a variable length of time during each operation comprising cam elements having a plurality of notches and a plurality of lobes coacting with said first switch, one to move the switch to one of its positions and the other to move it to the other of its positions, means for adjusting the circumferential distance between said notches and lobes to change the closed circuit position of said first switch as to the length of its timing period, said notches being plural in number, said cam assembly including means adjustable to block off one or more of said notches, said lobes being incapable of changing the position of said first switch except after its position has been reversely changed by one of said notches, the blocked off notches being incapable of moving said first switch to said position, and one of said lobes being higher than the others with its high portion operable to open said other switch.

7. In a timing switch, a pair of switches, a timer motor driven rotating element, a cam assembly frictionally driven thereby and manually rotatable independent of said element, said cam assembly being operable to control said switches at predetermined time intervals and comprising a cam element having notches and a cam element having lobes, both of which coact with said first switch, means for adjusting the circumferential distance between said notches and lobes as to the length of a timing period, and said cam assembly including a disk having variously positioned notches of different widths adjustable to block off one or more of said notches of said cam element.

8. In a timer, a rotating timing element, a cam assembly driven thereby, a switch, said cam assembly being operable to close said switch at predetermined time intervals and for a variable length of time during each operation, and means to effect such variation comprising cam elements having a plurality of notches and a corresponding plurality of lobes coacting with said switch, each notch to move the switch to one of its positions and each lobe to move the switch to the other of its positions, means for adjusting the circumferential distance between said notches and lobes to change the length of the timing period, said cam assembly including means adjustable to block off one or more of said notches, said lobes being incapable of changing the position of said switch except after its position has been reversely changed by one of said notches, and the blocked off notches being incapable of operating said switch.

9. In a timer, a pair of switches, one normally open and the other normally closed, a rotating timing element, a cam assembly frictionally driven thereby and manually rotatable independent of the timing element, said cam assembly being operable to close said first switch and open said second switch at predetermined time intervals and to close said first switch a variable length of time during each operation comprising three face-to-face cam disks, the first one provided with a plurality of notches, the second one provided with a similar plurality of notches, some of which are circumferentially longer than the notches of said first cam disk, said first and second disks being relatively adjustable so that the second disk is operable to block one or more of the notches of said first disk, and said third cam disk being provided with lobes, one for each of said notches of said first and second disks, said third disk being adjustable relative to said first disk to change the position of said lobes relative to the notches thereof, one of said lobes having an extended portion higher than the other lobes, said first switch being operable to one position by the unblocked notches of said first cam disk and operable to its other position by the lobes of said third cam disk providing it has previously been operated to said first position by a notch of said first cam disk, and the other of said switches being operable in addition to the first one by said extended portion of said cam lobe.

10. In a timer, a pair of switches, a rotating timer element, a cam assembly driven thereby, said cam assembly operating said first switch and said second switch at predetermined time intervals, means to adjust said intervals comprising three cams, the first one provided with a plurality of notches, the second one provided with a similar plurality of notches, some of which are longer than the notches of said first cam, said first and second cams being relatively adjustable so that the second cam is operable to block one or more of the notches of said first cam, and a third cam provided with lobes, one for each of said notches of said first and second cams, said third cam being adjustable relative to said first cam to change the position of said lobes relative to the notches thereof, one of said lobes being higher than the others, said first switch being operable to one position by the unblocked notches of said first cam and operable to its other position by the lobes of said third cam providing it has previously been operated to said first position by a notch of said first cam, and the other of said switches being operable in addition to the first one by said high cam lobe.

11. A timing switch and means for operating the same comprising a cam assembly including three cams, one provided with a plurality of notches, a second one provided with a similar plurality of notches, some of which are longer than the notches of said first cam, said first and second cams being relatively adjustable so that the second cam is operable to block one or more of the notches of said first cam, and a third cam being provided with lobes, one for each of said notches of said first and second cams, said third cam being adjustable relative to said first cam to change the position of its lobes relative to the notches thereof, one of said lobes being higher than the others, a portion of said timing switch being operable to one position by the unblocked notches of said first cam and operable to its other position by the lobes of said third cam providing it has previously been operated to said first position by a notch of said first cam, and another portion of said timing switch being operable by said high cam lobe.

LELAND B. WAGNER.

REFERENCES CITED

The following references are of record in the file of this patent:

UNITED STATES PATENTS

| Number | Name | Date |
| --- | --- | --- |
| 1,851,246 | Hall | Mar. 29, 1932 |
| 2,142,462 | Teeple | Jan. 3, 1939 |